US006429623B2

(12) United States Patent
Hanada (10) Patent No.: US 6,429,623 B2
(45) Date of Patent: Aug. 6, 2002

(54) POWER-SUPPLY UNIT INCORPORATING AN ELECTRIC DOUBLE LAYER CAPACITOR, AND A METHOD OF CHARGING THE ELECTRIC DOUBLE LAYER CAPACITOR

(75) Inventor: Yuji Hanada, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/824,249

(22) Filed: Apr. 3, 2001

(30) Foreign Application Priority Data

Apr. 5, 2000 (JP) .................................... 2000-103170

(51) Int. Cl.7 ...................... H01M 10/44; H01M 10/46
(52) U.S. Cl. ...................................... 320/116; 320/166
(58) Field of Search ................................ 320/116, 118, 320/119, 120, 122, 166, 167

(56) References Cited

U.S. PATENT DOCUMENTS

| 4,250,413 A | 2/1981 | Kawasaki et al. |
| 4,920,307 A | 4/1990 | Iketani |
| 5,323,100 A | 6/1994 | Iketani |
| 6,268,710 B1 * | 7/2001 | Koga ......................... 320/116 |

FOREIGN PATENT DOCUMENTS

| EP | 1041694 | 10/2000 |
| JP | 20 00 350375 | 12/2000 |

* cited by examiner

Primary Examiner—Edward H. Tso
(74) Attorney, Agent, or Firm—Greenblum & Bernstein, P.L.C.

(57) ABSTRACT

A power-supply unit includes a plurality of cells for supplying power to a load, a capacitor connected in parallel to the plurality of cells, at least one voltage detector which detects a terminal voltage across each of the plurality of cells, a selecting device for selecting a first combination from predetermined combinations of at least one of the plurality of cells in accordance with the terminal voltage, wherein the selected first combination of cells can supply a maximum voltage for charging the capacitor without exceeding a withstand voltage of the capacitor, and a controller for charging the electric double layer capacitor with the selected first combination of cells. A method of charging an electric double layer capacitor provided in the power-supply unit is also disclosed.

18 Claims, 7 Drawing Sheets

POWER-SUPPLY UNIT INCORPORATING AN ELECTRIC DOUBLE LAYER CAPACITOR, AND A METHOD OF CHARGING THE ELECTRIC DOUBLE LAYER CAPACITOR

BACKGROUND OF THE INVENTION

1. Field of the Invention

The present invention relates to a power-supply unit which incorporates an electric double layer capacitor. The present invention also relates to a method of charging the electric double layer capacitor.

2. Description of the Related Art

The electric double layer capacitor is a type of large-capacity capacitor, and features of the electric double layer capacitor include: a boost charge is possible in comparison with a secondary battery; service life is long; and category temperature range is wide. The electric double layer capacitor is often used as a backup power supply for an electronic device in combination with a battery.

When the electric double layer capacitor is connected in parallel to the battery, a plurality of electric double layer capacitors must be used and connected in series so that the sum of the withstand voltages of all the electric double layer capacitors exceeds the terminal voltage across the battery since the withstand voltage of the electric double layer capacitor is generally low (1~3 volts). In addition, when the electric double layer capacitor is charged with a power supply (a battery voltage) which provides voltage higher than the withstand voltage of the electric double layer capacitor, the battery voltage must be decreased by, e.g., a potential transformer, to be lower than the withstand voltage of the electric double layer capacitor before being supplied to the electric double layer capacitor. This results in an increase in size of an electronic device which incorporates the electric double layer capacitor, and also an increase in the cost of production of the electronic device.

SUMMARY OF THE INVENTION

An object of the present invention is to provide a power-supply unit which incorporates an electric double layer capacitor used in combination with a battery providing voltage higher than the withstand voltage of the electric double layer capacitor, wherein the electric double layer capacitor can be easily charged with a simple system. Another object of the present invention is to provide a method of charging such an electric double layer capacitor.

To achieve the object mentioned above, according to an aspect of the present invention, a power-supply unit is provided, including a plurality of cells for supplying power to a load; a capacitor connected in parallel to the plurality of cells; at least one voltage detector which detects a terminal voltage across each of the plurality of cells; a selecting device for selecting a first combination from predetermined combinations of at least one of the plurality of cells in accordance with the terminal voltage, wherein the selected first combination of cells can supply a maximum voltage for charging the capacitor without exceeding a withstand voltage of the capacitor; and a controller for charging the electric double layer capacitor with the selected first combination of cells.

In an embodiment, the capacitor is an electric double layer capacitor.

In an embodiment the selecting device selects the first combination from the predetermined combinations of at least one of the plurality of cells which are connected in series in order with respect to ground, so that a total voltage across the first combination of cells connected in series becomes maximum without exceeding the withstand voltage.

In an embodiment, the plurality of cells are connected in series, wherein the power-supply unit further includes a switch system for connecting each cell included in the first combination of cells to the electric double layer capacitor in parallel. The controller controls the switch system so that each cell included in the first combination of cells is connected in parallel to the electric double layer capacitor.

In an embodiment, the selecting device determines a cell from the plurality of cells which has the highest terminal voltage among the plurality of cells, and selects a second combination from the cell which has the highest terminal voltage among said plurality of cells or predetermined combinations of the cell which has the highest terminal voltage among said plurality of cells and at least one of the remaining cells of the plurality of cells; wherein the total voltage across the second combination of cells connected in series becomes maximum without exceeding a withstand voltage of the electric double layer capacitor.

In an embodiment, the selecting device selects the second combination from the predetermined combinations, wherein the total voltage across the second combination of cells connected in series becomes maximum without exceeding the withstand voltage of the electric double layer capacitor.

In an embodiment, the number of cells included in the second combination of cells is minimal, and the cells included in the second combination are selected in decreasing order of terminal voltage In an embodiment, the priority of selection of the second combination is firstly the closest combination to the withstand voltage, and secondly, the minimal number of cells.

In an embodiment, a second cell among the plurality of cells is removed from the predetermined combinations of cells if a voltage difference between the cell which has the highest terminal voltage among the plurality of cells and the second cell is greater than a reference value.

In an embodiment, the power-supply unit further includes a first switch system for connecting the plurality of cells in series in predetermined combinations, and a second switch system for connecting each of the predetermined combinations of cells to the electric double layer capacitor in parallel. The controller controls the first switch system so that cells included in the second combination are connected in series, and controls the second switch system so that the cells included in the second combination which are connected in series are connected in parallel with respect to the electric double layer capacitor.

In an embodiment, a step-up transformer is further provided which steps up a voltage output from the selected first combination of cells connected in series to a predetermined voltage level. The controller drives the step-up transformer to step up the voltage output from the selected combination of cells connected in series to supply the stepped up voltage to the load when the electric double layer capacitor is charged.

In an embodiment, the controller drives the step-up transformer to step up the voltage output from the selected first combination of cells connected in series to supply the stepped up voltage to the load when a total voltage of the plurality of cells is lower than a predetermined threshold value.

Preferably, an indicator is further provided for indicating various pieces of information; if a total voltage of the plurality of cells is lower than a predetermined threshold value, the controller sends signals to the indicator to display an indication for informing a user that there is not sufficient battery power to charge the electric double layer capacitor, and prohibits the electric double layer capacitor from being charged.

Preferably, the controller sends signals to the indicator to display an indication for warning a user that a particular cell included in the plurality of cells needs to be renewed, in the case where the terminal voltage across the particular cell which is detected via the at least one voltage detector is lower than a predetermined threshold value.

According to an aspect of the present invention, a power-supply unit is provided, including a battery chamber which accommodates a plurality of cells and includes a plurality of pairs of contact terminals, wherein each pair of contact terminals of the plurality of pairs of contact terminals respectively contact positive and negative electrodes of a corresponding one of the plurality of cells; an electric double layer capacitor which can be connected in parallel to the plurality of cells via the plurality of pairs of contact terminals; at least one voltage detector which detects a terminal voltage across each of the plurality of cells via the plurality of pairs of contact terminals; a selecting device for selecting a combination from predetermined possible combinations of serially-connected contact terminals included in the plurality of pairs of contact terminals in accordance with the terminal voltage, wherein a combination of cells of the plurality of cells which is determined by the selected possible combination of serially-connected contact terminals can supply a maximum voltage for charging the electric double layer capacitor without exceeding a withstand voltage of the electric double layer capacitor; and a controller which connects one and another terminals of the selected combination of serially-connected contact terminals to one and another terminals of the electric double layer capacitor.

According to another aspect of the present invention, a method is provided for charging an electric double layer capacitor provided in a power-supply unit in which at least two of a plurality of cells are connected in series to be connected in parallel to the electric double layer capacitor to supply power from the serially-connected at least two cells to a load. The charging method includes detecting a terminal voltage across each of the plurality of cells; selecting a combination from predetermined combinations of at least one of the plurality of cells in accordance with the terminal voltage, wherein the selected combination of cells can supply a maximum voltage for charging the electric double layer capacitor without exceeding a withstand voltage of the electric double layer capacitor; and connecting the selected combination of cells to the electric double layer capacitor in parallel to charge the electric double layer capacitor with the selected combination of cells.

Preferably, the at least one of the plurality of cells are connected in series in order with respect to ground, so that a total voltage across the combination of cells connected in series becomes maximum without exceeding the withstand voltage.

In an embodiment, the charging method further includes determining a cell from the plurality of cells which has the highest terminal voltage among the plurality of cells, and selecting a second combination from predetermined combinations of the determined cell and at least one of the remaining cells of the plurality of cells, wherein the total voltage across the second combination of cells connected in series becomes maximum without exceeding a withstand voltage of the electric double layer capacitor.

The present disclosure relates to subject matter contained in Japanese Patent Application No.2000-103170 (filed on Apr. 5, 2000) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
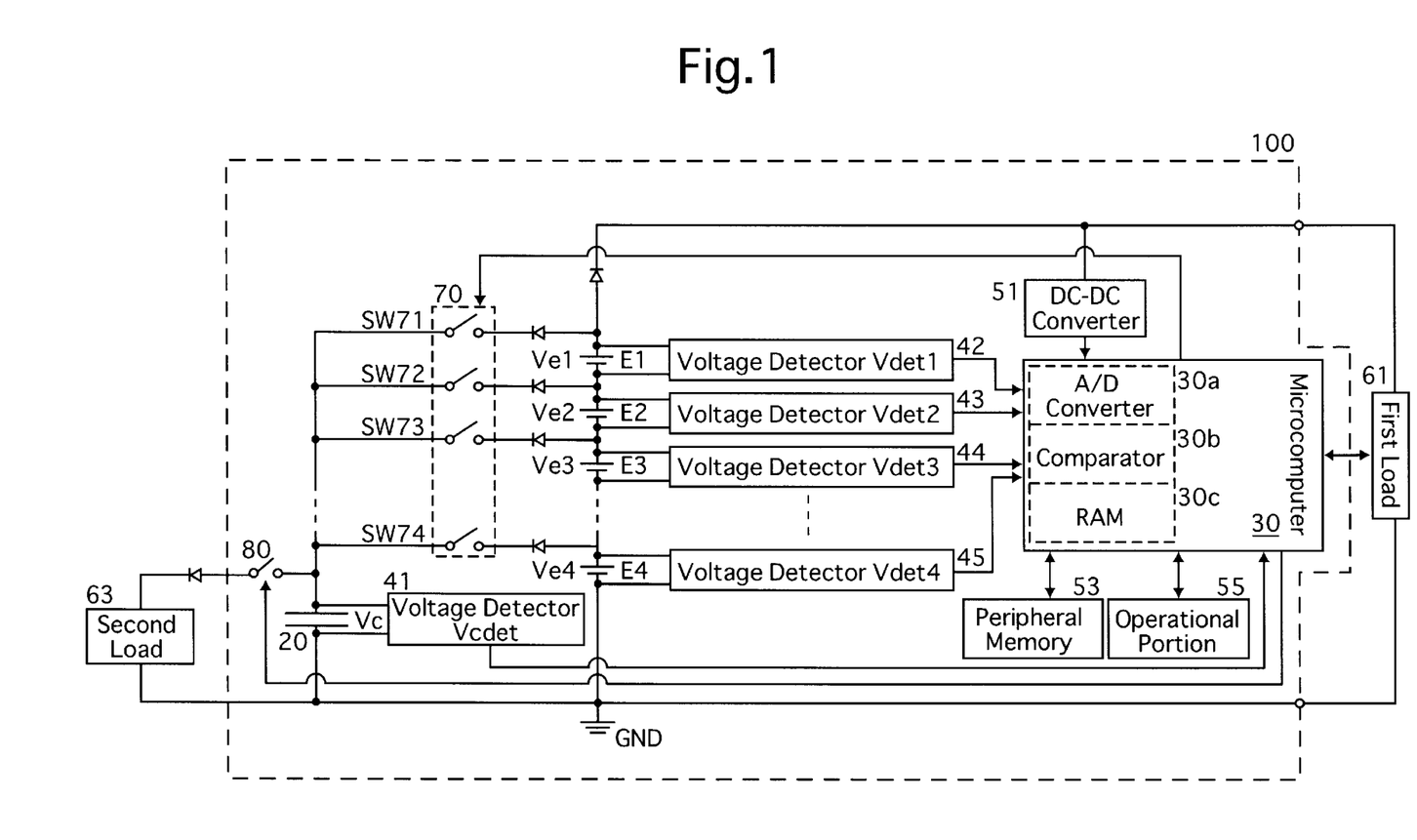
FIG. 1 is a schematic circuit diagram of fundamental elements of the first embodiment of a power-supply unit which incorporates a charger for charging an electric double layer capacitor provided in the power-supply unit, according to the present invention.

FIG. 1 shows fundamental elements of a power-supply unit 100 of the first embodiment which incorporates a charger for charging an electric double layer capacitor provided in the power-supply unit 100, to which the present invention is applied. The power-supply unit 100 is provided with four cells, i.e., first through fourth cells (secondary cells or rechargeable cells) E1, E2, E3 and E4, and an electric double layer capacitor 20 that can be connected in parallel to the four cells E1 through E4. The power-supply unit 100 can use the electric double layer capacitor 20 as a backup power supply for the four cells E1, E2, E3 and E4.

The four cells E1, E2, E3 and E4 function as a power source for driving a first load 61 that is connected to the power-supply unit 100 and also as a power source for charging the electric double layer capacitor 20 via a group of switches 70 (first through fourth switches SW71, SW72, SW73 and SW74).

The electric double layer capacitor 20 is supplied with power from the four cells E1 through E4, which are connected to the electric double layer capacitor 20 via the group of switches 70, so that the voltage on the electric double layer capacitor 20 is maintained to be higher than a predetermined voltage. The electric double layer capacitor 20 drives a second load 63 when a switch 80 is ON.

The power-supply unit 100 is provided with a microcomputer (controller/selecting device) 30 for comprehensively controlling the overall operations of the power-supply unit 100 and for controlling a charge control process for the electric double layer capacitor 20. The microcomputer 30 incorporates an A/D converter 30*a*, a comparator 30*b* and a RAM 30*c*. The RAM 30*c* stores various pieces of information. The power-supply unit 100 is provided with first through fifth voltage detectors 41, 42, 43, 44 and 45, a DC—DC converter 51, a peripheral memory 53 and an operational portion 55 which are all connected to the microcomputer 30.

The first voltage detector 41 is connected across the electric double layer capacitor 20 to detect a terminal voltage Vc across the electric double layer capacitor 20 to output the detected terminal voltage to the microcomputer 30.

The second voltage detector 42 is connected across the first cell E1 to detect a terminal voltage Ve1 across the first cell E1 to output the detected terminal voltage to the microcomputer 30. Likewise, the third voltage detector 43 is connected across the second cell E2 to detect a terminal voltage Ve2 across the second cell E2 to output the detected terminal voltage to the microcomputer 30. Likewise, the fourth voltage detector 44 is connected across the third cell E3 to detect a terminal voltage Ve3 across the third cell E3 to output the detected terminal voltage to the microcomputer 30. Likewise, the fifth voltage detector 45 is connected across the fourth cell E4 to detect a terminal voltage Ve4 across the fourth cell E4 to output the detected terminal voltage to the microcomputer 30.

The microcomputer 30 performs a charging operation for charging the electric double layer capacitor 20 when the terminal voltage Vc of the electric double layer capacitor 20, which is detected via the first voltage detector 41, is lower than a predetermined threshold value V1 which is used as a reference value to determine whether it is necessary to charge the electric double layer capacitor 20. The microcomputer 30 firstly calculates a total voltage V-total of one or a combination of two or more of the serially-connected cells E1 through E4 in each of four different cases where the cells E1 through E4 are connected in series in turn from the side of a ground GND, in accordance with the terminal voltages Ve1 through Ve4 that are respectively detected via the second through fifth voltage detectors 42 through 45. More specifically, in accordance with the terminal voltages Ve1 through Ve4, the microcomputer 30 firstly calculates the following four voltages in the following order: the voltage of only the fourth cell E4 as the total voltage V-total, the sum of the voltages of the third and fourth cells E3 and E4 as the total voltage V-total, the sum of the voltages of the second, third and fourth cells E2, E3 and E4 as the total voltage V-total, and the sum of the voltages of all the first through fourth cells E1, E2, E3 and E4 as the total voltage V-total. Subsequently, the microcomputer 30 determines one case from the above four different cases in which the total voltage V-total becomes maximum without exceeding a withstand voltage Vmax of the electric double layer capacitor 20. Subsequently, the microcomputer 30 turns ON one or more switches of the group of switches 70 so that one or more of the four cells E1 through E4 in the determined case (one of the above described four cases) are connected in parallel to the electric double layer capacitor 20 to charge the electric double layer capacitor 20.

The DC—DC converter 51 converts the output voltage of the cells E1 through E4 into a constant voltage to supply the constant voltage to the microcomputer 30. The peripheral memory 53 stores charge control data such as the aforementioned threshold value V1 and the withstand voltage Vmax of the electric double layer capacitor 20, and various rewritable parameters. The microcomputer 30 reads and writes data and others from and in the peripheral memory 53 when necessary. The operational portion 55 is provided with various operational members (e.g., control buttons and switches) for operating processes and operations of the power-supply unit 100. When the operational portion 55 is operated by the user, the microcomputer 30 operates in accordance with the operation by the user.

The microcomputer 30 exchanges signals with the first load 61 to drive the first load 61 in a manner corresponding to the operation of the operational portion 55. In addition, the microcomputer 30 switches an open/closed state of the switch 80, which connects the electric double layer capacitor 20 with the second load 63, to turn ON and OFF power supply for the second load 63.

Figure 2:
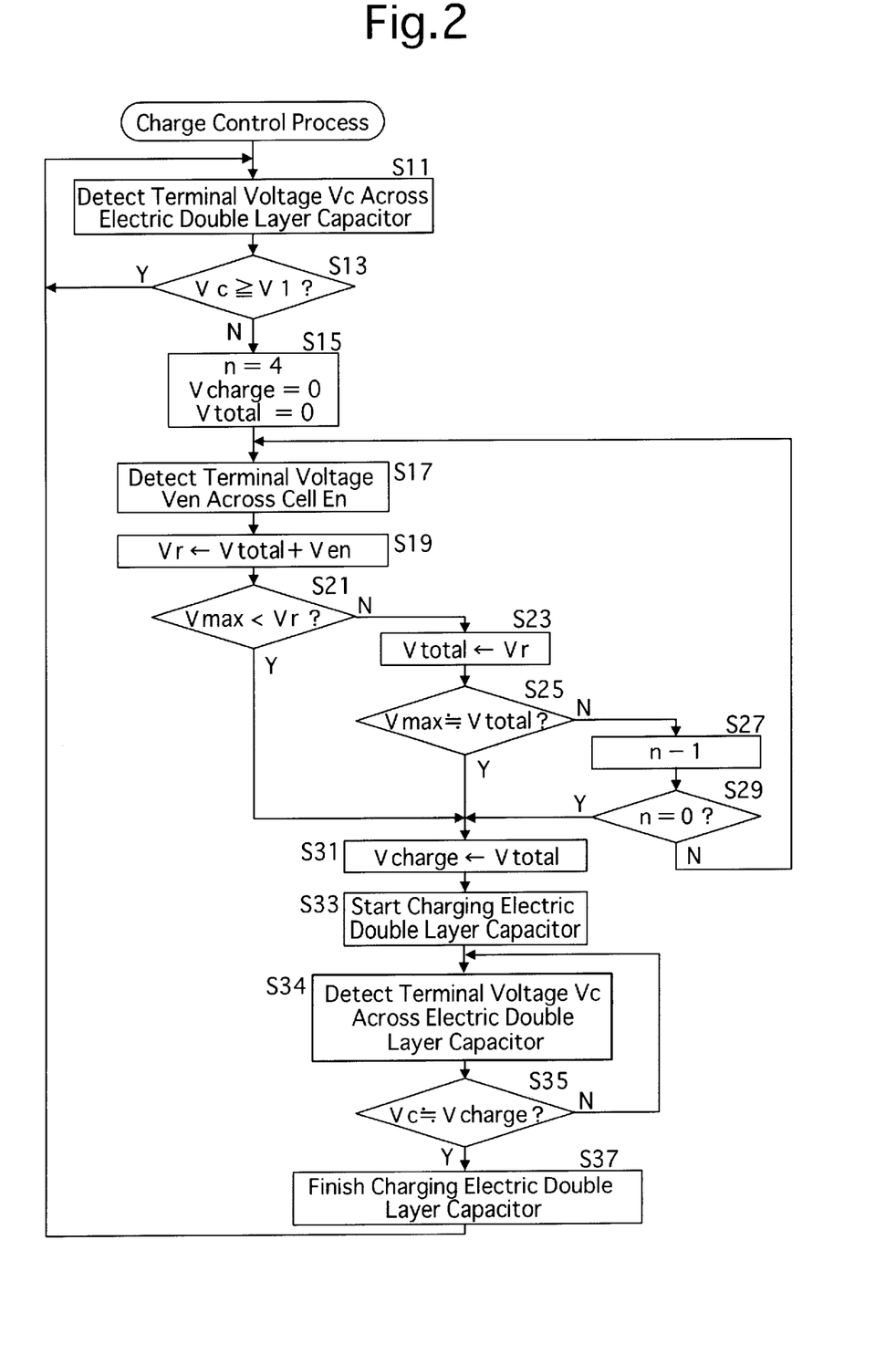
FIG. 2 is a flow chart of a charge control process for the charger of the first embodiment.

With the above-described structure, the charge control process performed by the microcomputer 30 in the first embodiment of the power-supply unit 100 will be hereinafter discussed in detail with reference to the flow chart shown in FIG. 2.

The charge control process starts immediately after the main power supply of the power-supply unit 100 is turned ON. All the first through fourth switches SW71, SW72, SW73 and SW74 of the group of switches 70 are OFF at their defaults. Immediately after control enters the charge control process, the terminal voltage Vc across the electric double layer capacitor 20 is detected via the first voltage detector 41 (step S11). The detected terminal voltage Vc is converted into a digital value via the A/D converter 30a to be stored in the RAM 30c. Subsequently, it is determined whether the detected terminal voltage Vc is equal to or greater than the aforementioned threshold value V1, which is used as a reference value to determine whether it is necessary to charge the electric double layer capacitor 20, via the comparator 30b (step S13). If the detected terminal voltage Vc is equal to or greater than the threshold value V1, it is unnecessary to charge the electric double layer capacitor 20, so that control returns to step S11 (if "YES" at step S13).

If it is determined at step S13 that the detected terminal voltage Vc is smaller than the threshold value V1 (if "NO" at step S13), control proceeds to step S15 to perform the process from step S15 to step S31 to determine a charge voltage V-charge for charging the electric double layer capacitor 20. First of all, a variable n, the total voltage V-total and the charge voltage V-charge are set at four, zero and zero, respectively, and these numerical values are stored in the RAM 30c (step S15). Subsequently, the terminal voltage Ven across the cell En ("n" herein is the aforementioned variable) is detected (step S17). The variable n is an identification number for each of the four cells E1, E2, E3 and E4 of the power-supply unit 100. In the illustrated embodiment, the variable n is greater as the position of connection of the associated cell is closer to ground GND. Similar to the terminal voltage Vc across the electric double layer capacitor 20, the terminal voltage Ven of the cell En is converted into a digital value via the A/D converter 30a to be stored in the RAM 30c.

Subsequently, the sum of the terminal voltage Ven of the cell En and the total voltage V-total is stored as an adjustment voltage Vr in the RAM 30c (step S19), and it is determined whether the adjustment voltage Vr is greater than the withstand voltage Vmax of the electric double layer capacitor 20 via the comparator 30b (step S21).

If the adjustment voltage Vr is equal to or smaller than the withstand voltage Vmax (if "NO" at step S21), the total voltage V-total stored in the RAM 30c is replaced by the adjustment voltage Vr to be stored as the total voltage V-total in the RAM 30c (step S23). Subsequently, it is determined whether this newly set total voltage V-total is nearly equal to the withstand voltage Vmax via the comparator 30b (step S25).

If the newly set total voltage V-total is within a predetermined range which is considered nearly equal to the withstand voltage Vmax (if "YES" at step S25), this means that the total voltage V-total which becomes maximum without exceeding the withstand voltage Vmax of the electric double layer capacitor 20 has been detected, so that the newly set total voltage V-total is stored as the charge voltage V-charge in the RAM 30c (step S31). Thereafter control proceeds to step S33.

If the newly set total voltage V-total is out of the aforementioned predetermined range, which is considered nearly equal to the withstand voltage Vmax (if "NO" at step S25), the variable n is decreased by one to obtain the total voltage V-total which is closer to the withstand voltage Vmax (step S27), and subsequently it is determined whether the variable n is equal to zero (step S29). If the variable n is zero (if "YES" at step S29), this means that the total voltage V-total currently stored in the RAM 30c is the total voltage of all the cells E1 through E4 connected in series and that a voltage higher than the current total voltage V-total cannot be supplied to the electric double layer capacitor 20. Therefore, the total voltage V-total currently stored in the RAM 30c is stored as the charge voltage V-charge in the RAM 30c (step S31). If the variable n is not zero (if "NO" at step S29), control returns to step S17 to repeat the operations from step S17 to step S29 until it is determined "YES" at one of the operations at steps S21, 25 or 29, to thereby determine the total voltage V-total which becomes maximum without exceeding the withstand voltage Vmax of the electric double layer capacitor 20.

If the adjustment voltage Vr is greater than the withstand voltage Vmax (if "YES" at step S21), control proceeds to step S31 to charge the electric double layer capacitor 20 with voltage lower than the withstand voltage Vmax. At step S31, the total voltage V-total stored in the RAM 30c is stored as the aforementioned charge voltage V-charge in the RAM 30c. Thereafter control proceeds to step S33.

At step S33, one or more switches of the group of switches 70 (the first through fourth switches SW71, SW72, SW73 and SW74) are selectively turned ON so that one or more of the four cells E1 through E4 the battery voltage of which becomes equal to the determined total voltage V-total are connected in parallel to the electric double layer capacitor 20 to start charging the electric double layer capacitor 20. Subsequently, the electric double layer capacitor 20 continues to be charged while the terminal voltage Vc across the electric double layer capacitor 20 is monitored via the first voltage detector 41 until the terminal voltage Vc becomes nearly equal to the charge voltage V-charge (step S34 and if "NO" at step S35, or step S149 and if "NO" at step S151). If the terminal voltage Vc becomes nearly equal to the charge voltage V-charge (if "YES" at step S35), the group of switches 70 are all turned OFF to end the charging of the electric double layer capacitor 20 (step S37), and subsequently control returns to step S11.

As can be understood from the above descriptions, according to the first embodiment of the power-supply unit 100, the electric double layer capacitor 20 is charged with the charge voltage V-charge which becomes maximum without exceeding the withstand voltage Vmax of the electric double layer capacitor 20 with one cell or more than one of the four cells E1 through E4 which are connected in series in turn from the side of ground GND.

Therefore, even if the sum of the terminal voltages across the cells used in combination with the electric double layer capacitor 20 is greater than the withstand voltage Vmax, a plurality of electric double layer capacitors do not have to be used and connected in series so that the sum of the withstand voltages Vmax of all the electric double layer capacitors exceeds the terminal voltage across the cells, and also the electric double layer capacitor 20 can be charged without the use of a voltage converter and the like. Consequently, the power-supply unit 100 can be made small and compact with a low cost of production. This contributes to downsizing the electronic device which incorporates a power-supply unit 100 to which the present invention is applied, and also contributes to reductions in the cost of production of the electronic device.

If the switch 80 is turned ON to connect the second load 63 to the electric double layer capacitor 20, the second load 63 can be driven without using a voltage converter or the like. Even if none of the cells E1 through E4 are connected to the power-supply unit 100 (this includes the case where all the cells E1 through E4 are flat), the second load 63 can be driven. In the case where the second load 63 is a load requiring a backup power supply, the electric double layer capacitor 20 functions as a backup power supply, so that any extra backup power supply does not have to be provided.

Furthermore, according to the first embodiment of the power-supply unit 100, since the electric double layer capacitor 20 is charged with the charge voltage V-charge that is close to the withstand voltage Vmax, the charging efficiency per charge can be improved.

Figure 3:
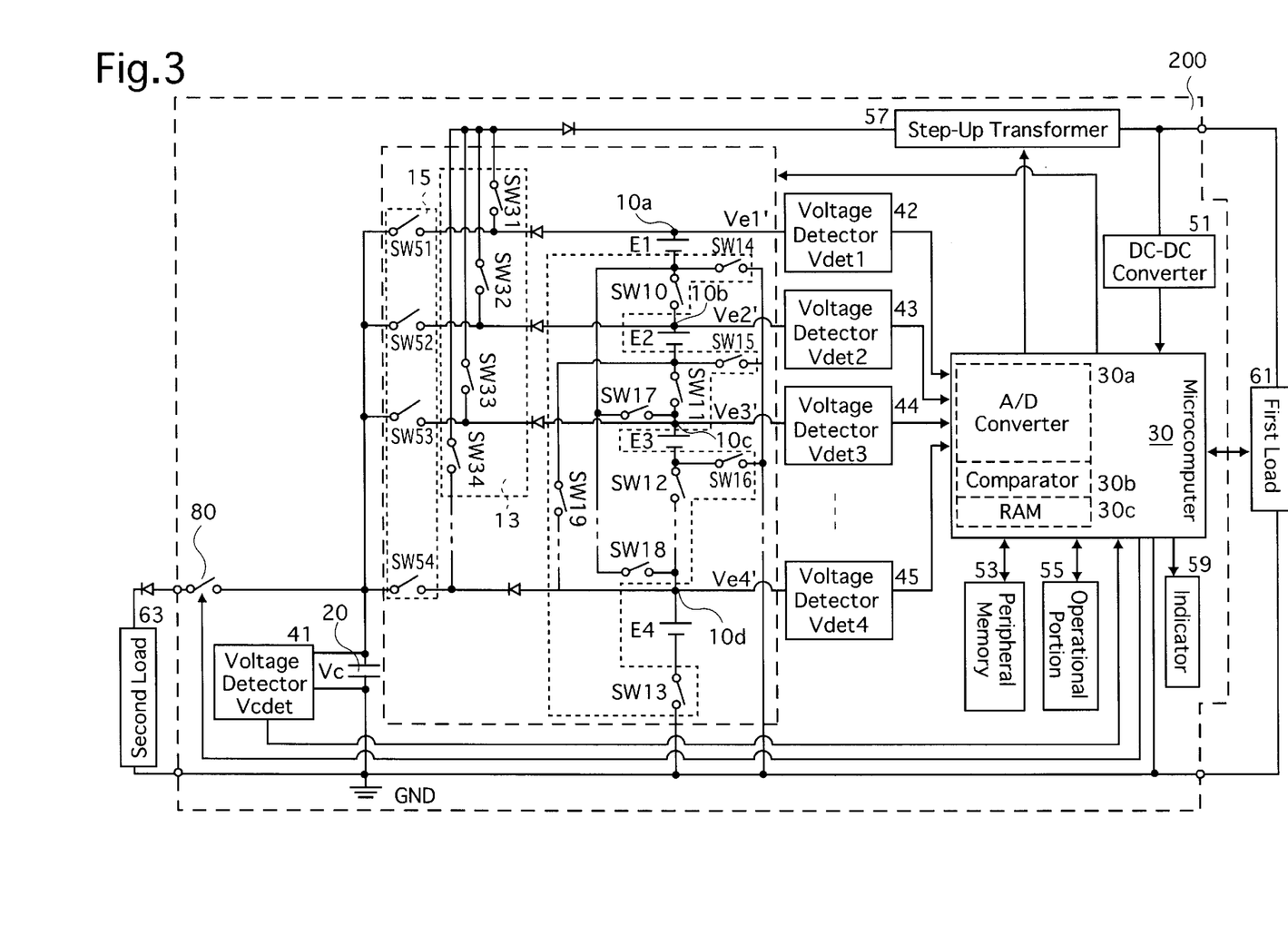
FIG. 3 is a schematic circuit diagram of fundamental elements of the second embodiment of the power-supply unit which incorporates a charger for charging an electric double layer capacitor provided in the power-supply unit, according to the present invention.

FIG. 3 shows fundamental elements of a power-supply unit 200 of the second embodiment which incorporates a charger for charging an electric double layer capacitor provided in the power-supply unit 200, to which the present invention is applied. The second embodiment of the power-supply unit 200 is similar to the power-supply unit 100 of the first embodiment in that the electric double layer capacitor 20 is charged with the charge voltage V-charge which becomes maximum without exceeding the withstand voltage Vmax of the electric double layer capacitor 20. However, unlike in the power-supply unit 100 of the first embodiment wherein the electric double layer capacitor 20 is charged with the charge voltage V-charge which is maximum at one or more of the four cells E1 through E4 which are connected in series in order with respect to ground GND, in the power-supply unit 200 of the second embodiment, the electric double layer capacitor 20 is charged with the charge voltage V-charge which is maximum at the terminal voltage which is the highest among all the cells E1, E2, E3 or E4, and another one or more of the remaining three cells are connected in series.

Parts or elements of the second embodiment which are identical to those of the first embodiment are designated by the same reference numerals, and accordingly will not be hereinafter described in detail. The fundamental elements of the second embodiment of the power-supply unit 200 shown in FIG. 3 include a battery chamber 10, a step-up transformer (DC—DC converter) 57 and an indicator (e.g., an LCD panel) 59. These elements 10, 57 and 59 will be hereinafter discussed in detail.

Figure 4:
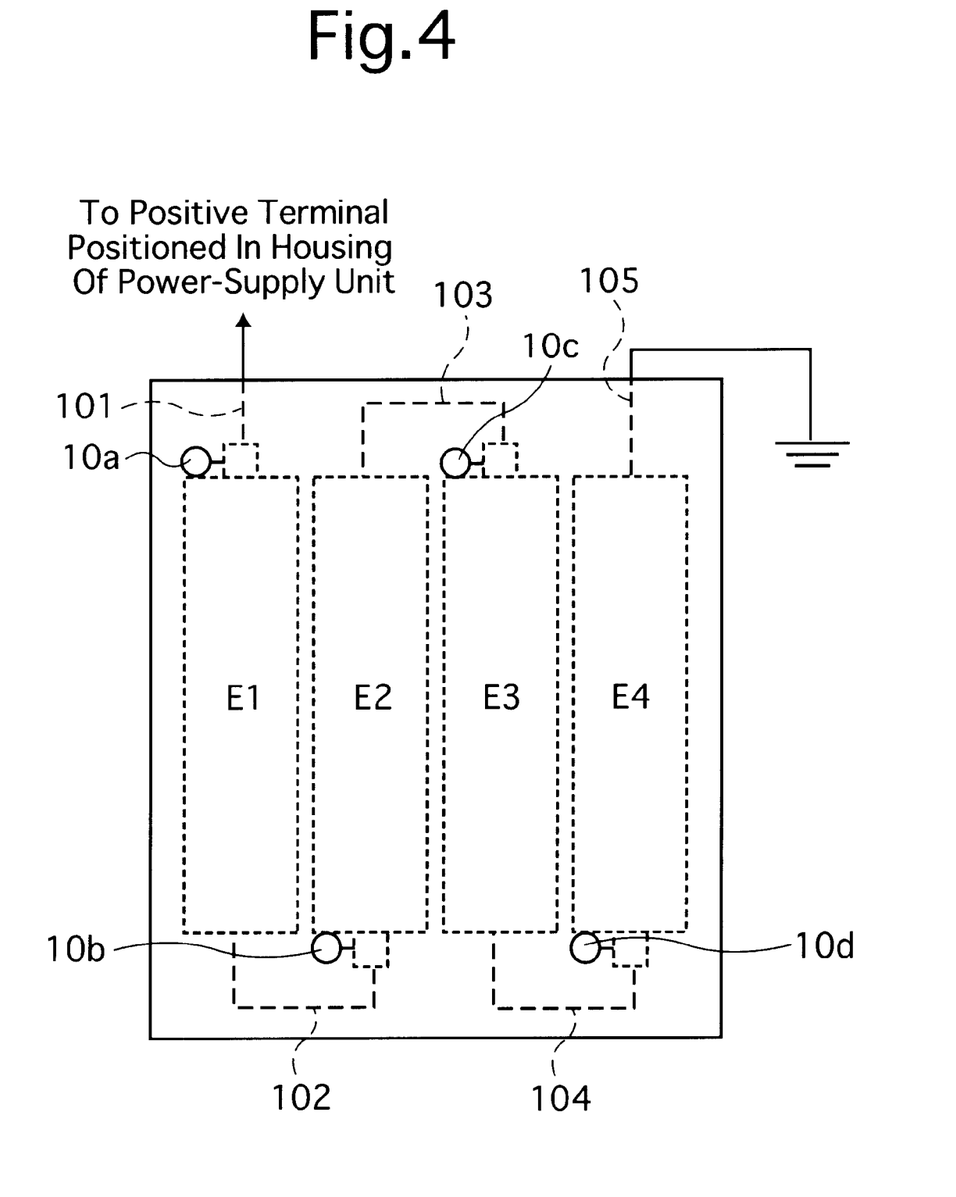
FIG. 4 is a schematic diagram of a battery chamber of the charger of the second embodiment shown in FIG. 3.

The four cells E1 through E4 can be accommodated in and removed from the battery chamber 10. The battery chamber 10 is provided with contact terminals 10a through 10d which are arranged at different positions from contact terminals 101 through 105 which respectively contact the positive and negative electrodes of each of the four cells E1 through E4 (see FIG. 4). Each of the four contact terminals 10a through 10d connects the positive electrode of the corresponding cell E1, E2, E3 or E4 to the corresponding voltage detector 42, 43, 44 or 45. A first group of switches 11 (SW10 through SW18), a second group of switches 13 (SW31 through SW34) and a third group of switches 15 (SW51 through SW54) are connected to the four contact terminals 10a through 10d in a predetermined pattern. The first group of switches 11 can connect the four cells E1 through E4 to one another in series in a given pattern, the second group of switches 13 can connect one or a combination of two or more of the four cells E1 through E4 connected in series to the first load 61, and the third group of switches 15 can connect one or a combination of two or more of the four cells E1 through E4 connected in series to the electric double layer capacitor 20 in parallel.

The second voltage detector 42 detects a voltage Ve1' across the positive electrode of the serially-connected four cells E1 through E4 and ground GND to output the detected voltage to the microcomputer 30. The third voltage detector 43 detects a voltage Ve2' across the positive electrode of the serially-connected three cells E2, E3 and E4 and ground GND to output the detected voltage to the microcomputer 30. The fourth voltage detector 44 detects a voltage Ve3' across the positive electrode of the serially-connected two cells E3 and E4 and ground GND to output the detected voltage to the microcomputer 30. The fifth voltage detector 45 detects a voltage Ve4' across the positive electrode of the cell E4 and ground GND to output the detected voltage to the microcomputer 30. The voltage Ve1' is higher than any other voltages Ve2', Ve3' and Ve4' since the voltage Ve1' is the voltage across the positive electrode of the serially-connected four cells E1 through E4 and ground GND, i.e., the total voltage of all the four cells E1 through E4 connected in series.

The microcomputer 30 performs a charging operation for charging the electric double layer capacitor 20 when the terminal voltage Vc of the electric double layer capacitor 20, which is detected via the first voltage detector 41, is lower than a predetermined first threshold value V1 which is used as a reference value to determine whether it is necessary to charge the electric double layer capacitor 20. The microcomputer 30 firstly calculates each of the terminal voltages Ve1, Ve2, Ve3 and Ve4 across the four cells E1, E2, E3 and E4 in accordance with the voltages Ve1', Ve2', Ve3' and Ve4' detected via the voltage detectors 42, 43, 44 and 45, respectively, to determine the cell which has the highest terminal voltage among the four cells E1, E2 and E3 and E4. Subsequently, the microcomputer 30 determines a combination of the determined cell E1, E2, E3 or E4 having the highest terminal voltage and at least one of the remaining three cells, wherein the total voltage across the combination of these cells connected in series becomes maximum without exceeding the withstand voltage Vmax of the electric double layer capacitor 20 on condition that the number of cells included in the combination is minimal and that the cells included in the combination are selected in decreasing order of terminal voltage. Subsequently, the first group of switches 11 is selectively turned ON so that the cells of the determined combination are connected in series. Subsequently, the third group of switches 15 are selectively turned ON so that the serially-connected cells are connected in parallel to the electric double layer capacitor 20 to charge the electric double layer capacitor 20. In the case where the aforementioned remaining three cells are all dead, the microcomputer 30 cannot determine any combination of cells but selects only one cell (i.e., the cell which has the highest terminal voltage among the four cells E1, E2, E3 and E4) if the remaining power of the cell is greater than a predetermined value (i.e., the third threshold value V3 which will be discussed later).

The step-up transformer 57 steps up the voltage output from the four cells E1 through E4, i.e., from the battery chamber 10. The microcomputer 30 drives the step-up transformer 57 to make the first load 61 operate with stability. Furthermore, if the voltage Ve1' across the positive terminal of the first cell E1 and ground GND is lower than a predetermined second threshold value V2 which is used as a reference value to determine whether it is necessary to drive the step-up transformer 57, the microcomputer 30 drives the step-up transformer 57 to make the first load 61 operate with stability since the remaining quantity of power of the battery is low.

If the voltage Ve1' across the positive electrode of the serially-connected four cells E1 through E4 and ground GND is lower than a predetermined third threshold value V3 which is used as a reference value to determine whether it is possible to charge the electric double layer capacitor 20, the microcomputer 30 sends signals to the indicator 59 to indicate "Low Battery" thereon, informing the user that the battery is too weak to charge the electric double layer capacitor 20. The indicator 59 can indicate various types of information. Additionally, the microcomputer 30 can send signals to the indicator 59 to indicate information in accordance with a signal output from the first load 61. The first, second and third threshold values V1, V2 and V3 are stored in the peripheral memory 53. The third threshold value V3 is set to be smaller than the second threshold value V2.

Figure 5:
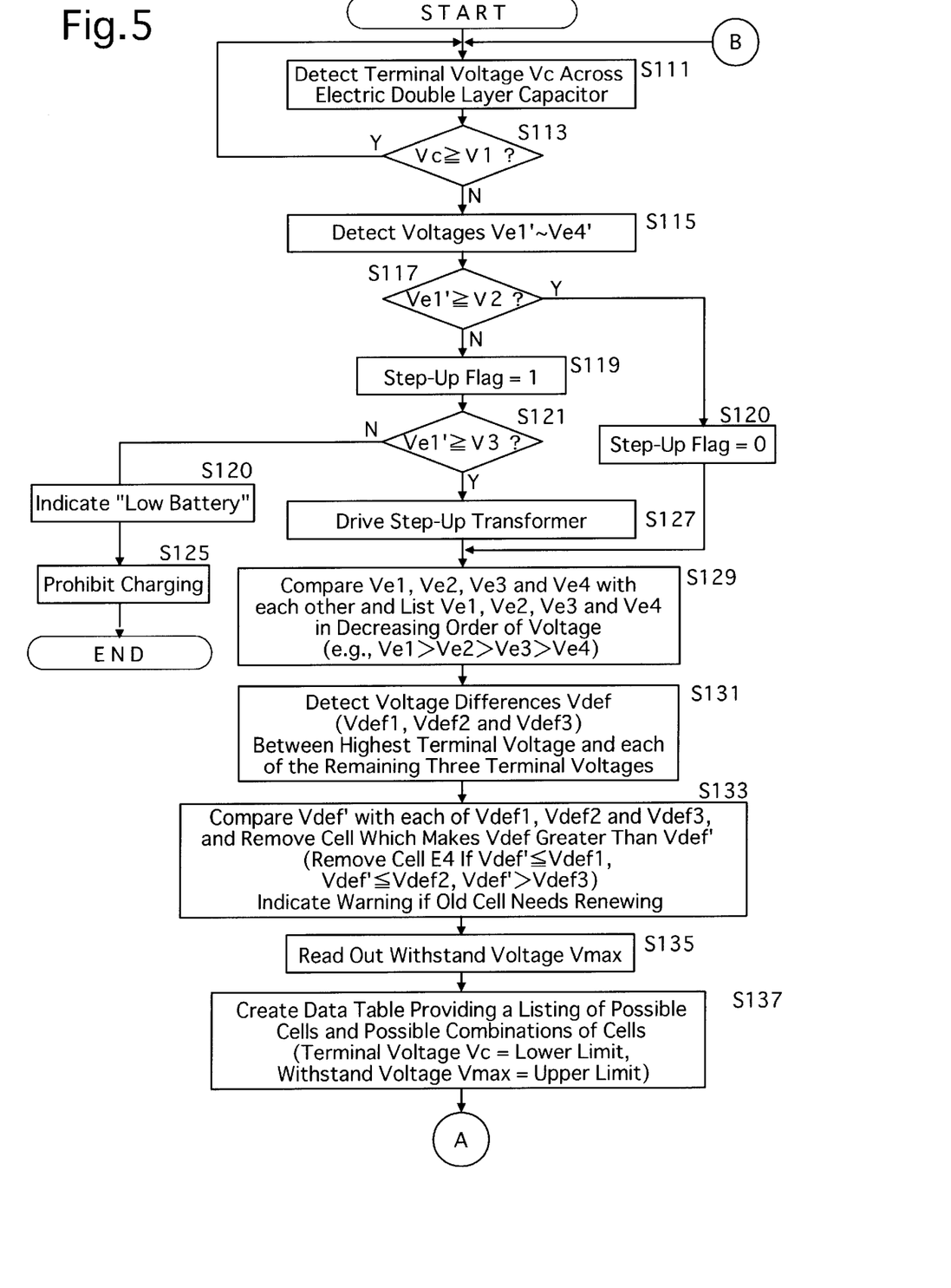
FIG. 5 is a flow chart of a part of a charge control process for the charger of the second embodiment.
Figure 6:
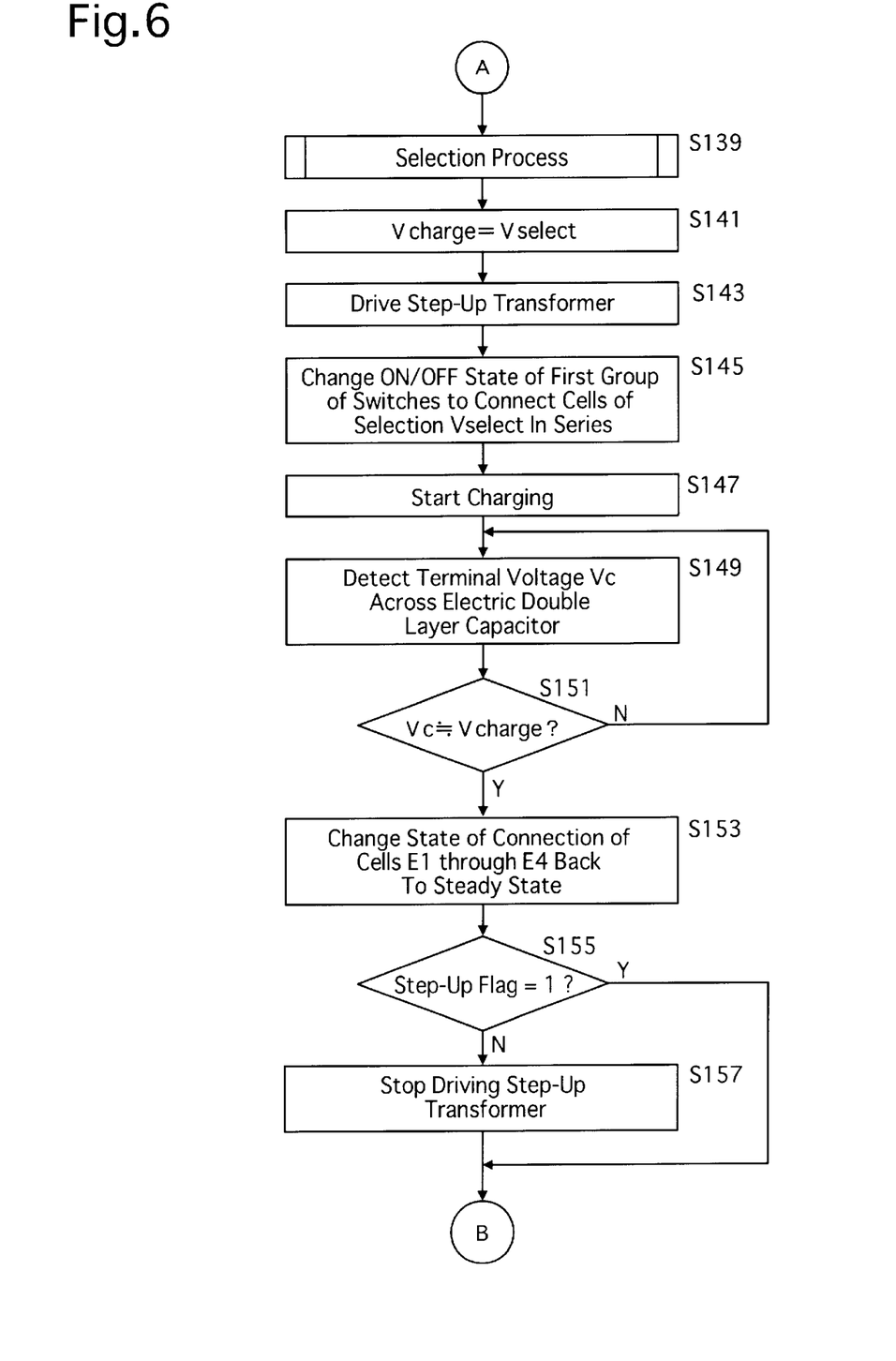
FIG. 6 is a flow chart of the remaining part of the charge control process for the charger of the second embodiment.
Figure 7:
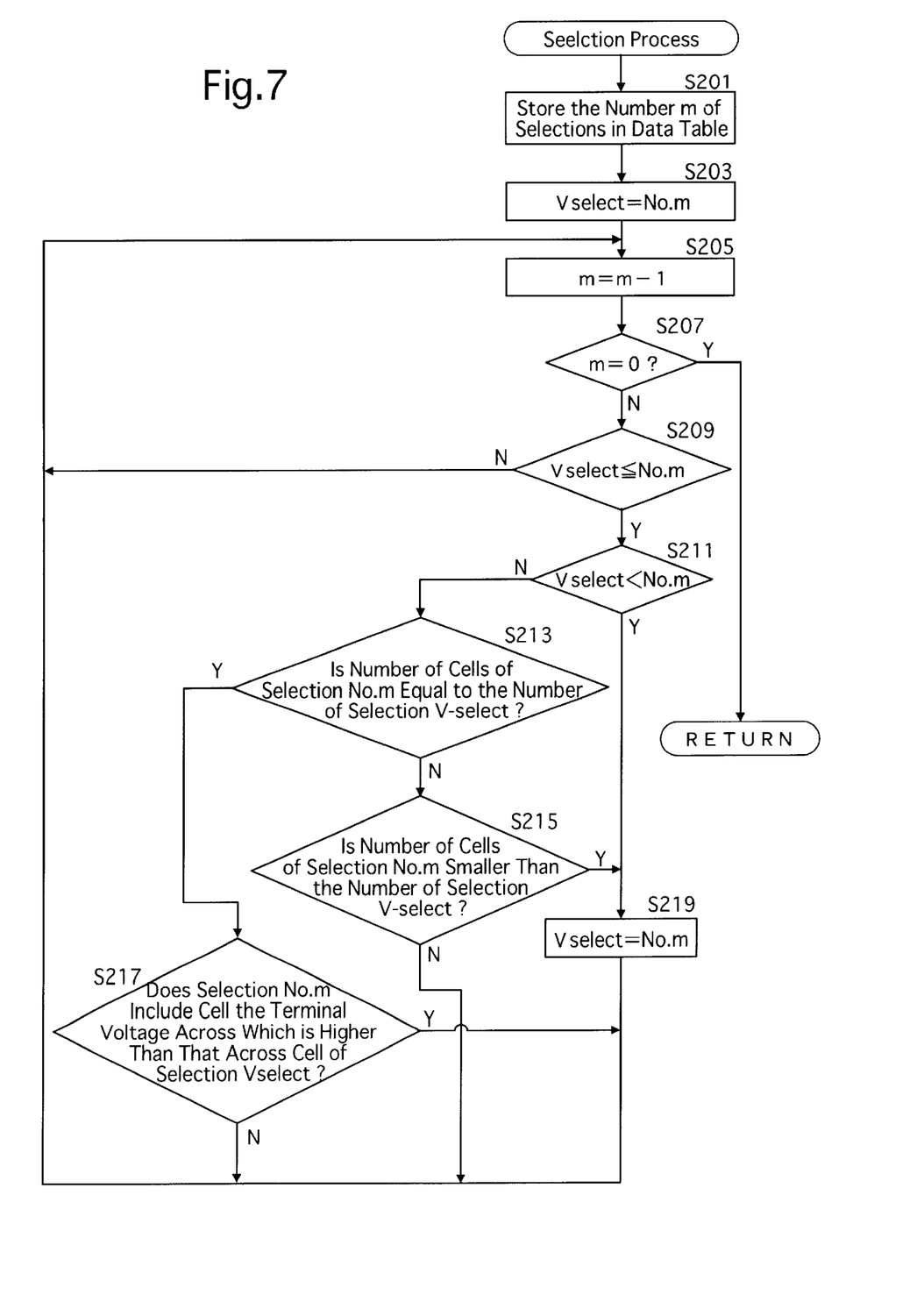
FIG. 7 is a flow chart of a combination selection process performed in the charge control process for the charger of the second embodiment.

The charge control process performed by the microcomputer 30 in the second embodiment of the power-supply unit 200 will be hereinafter discussed in detail with reference to the flow chart shown in FIGS. 5 through 7.

The charge control process starts immediately after the main power supply of the power-supply unit 200 is turned ON. The switches SW10, SW11, SW12 and SW13 of the first group of switches 11, and switch SW31 of the second group of switches 13 are turned ON at their defaults, while the remaining switches of the first, second and third group of switches 11, 13 and 15 are turned OFF at their defaults.

Immediately after control enters the charge control process, the terminal voltage Vc across the electric double layer capacitor 20 is detected via the first voltage detector 41 (step S111). The detected terminal voltage Vc is converted into a digital value via the A/D converter 30a to be stored in the RAM 30c. Subsequently, it is determined whether the detected terminal voltage Vc is equal to or greater than the aforementioned first threshold value v1, which is used as a reference value to determine whether it is necessary to charge the electric double layer capacitor 20, via the comparator 30b (step S113). If the detected terminal voltage Vc is equal to or greater than the first threshold value V1, it is unnecessary to charge the electric double layer capacitor 20, so that control returns to step S111 (if "YES" at step S113).

If it is determined at step S113 that the detected terminal voltage Vc is smaller than the first threshold value V1 (if "NO" at step S113), the aforementioned voltages Ve1', Ve2', Ve3' and Ve4' are detected via the voltage detectors 42, 43, 44 and 45, respectively, to determine the charge voltage V-charge for charging the electric double layer capacitor 20 (step S115). Similar to the detected terminal voltage Vc, each of the voltages Ve1', Ve2', Ve3' and Ve4' is converted into a digital value via the A/D converter 30a to be stored in the RAM 30c. Subsequently, it is determined whether the detected voltage Ve1' is equal to or greater than the aforementioned second threshold value V2, which is used as a reference value to determine whether it is necessary to drive the step-up transformer 57, via the comparator 30b (step S117). If the detected voltage Ve1' is equal to or greater than the second threshold value V2 (if "YES" at step S117), the first load 61 can be made to operate with stability without driving the step-up transformer 57, so that a step-up flag is set to zero, and control returns to step S129. The step-up flag is set to one in the case where it is necessary to drive the step-up transformer 57 in a steady state (i.e., in a state where the electric double layer capacitor 20 is not charged). The default value of the step-up flag is zero.

If the detected voltage Ve1' is smaller than the second threshold value V2 (if "NO" at step S117), the step-up flag is set to one (step S119), and subsequently it is determined whether the detected voltage Ve1' is equal to or greater than the aforementioned third threshold value V3, which is used as a reference value to determine whether it is possible to charge the electric double layer capacitor 20, via the comparator 30b (step S121). If the detected voltage Ve1' is smaller than the third threshold value V3 (if "NO" at step S121), the battery has become too weak to charge the electric double layer capacitor 20, so that "Low Battery" is indicated on the indicator 59 (step S123). Subsequently, the electric double layer capacitor 20 is prohibited from being charged (step S125) and control ends. If the detected voltage Ve1' is equal to or greater than the third threshold value V3 (if "YES" at step S121), the remaining quantity of power of the battery is low, though it is possible to charge the electric double layer capacitor 20, so that the step-up transformer 57 is driven to make the first load 61 operate with stability (step S127).

The terminal voltages Ve1, Ve2, Ve3 and Ve4 across the first, second, third and fourth cells E1, E2, E3 and E4, respectively, are determined in accordance with the detected voltages Ve1', Ve2', Ve3' and Ve4', and the terminal voltages Ve1, Ve2, Ve3 and Ve4 are compared with one another to be ordered in decreasing order of voltage (step S129). As described above, the voltage Ve1' is the voltage across the positive electrode of the serially-connected four cells E1 through E4 and ground GND, the voltage Ve2' is the voltage across the positive electrode of the serially-connected three cells E2 through E4 and ground GND, the voltage Ve3' is the voltage across the positive electrode of the serially-connected two cells E3 and E4 and ground GND, and the voltage Ve4' is the voltage across the positive electrode of the cell E4 and ground GND, the terminal voltage Ve1 across the first cell E1, for instance, can be calculated by subtracting the voltage Ve2' from the voltage Ve1'. As an example, supposing that the terminal voltages Ve1, Ve2, Ve3 and Ve4 across the first, second, third and fourth cells E1, E2, E3 and E4 are 1.50 V, 1.45 V, 1.42 V and 1.20 V, respectively, the operation at step S129 results in "Ve1>Ve2>Ve3>Ve4."

Each difference between the highest terminal voltage and each of the remaining three terminal voltages among the four terminal voltages Ve1, Ve2, Ve3 and Ve4 is calculated as a voltage difference Vdef (Vdef1, Vdef2 or Vdef3) (step S131). In the aforementioned example, since the voltage Ve1' is the highest, the difference between the terminal voltage Ve1 (=1.50 V) and the terminal voltage Ve2 (=1.45 V) is stored as a first voltage difference Vdef1 (=0.05 V), the difference between the terminal voltage Ve1 (=1.50 V) and the terminal voltage Ve3 (=1.42 V) is stored as a second voltage difference Vdef2 (=0.08 V), and the difference between the terminal voltage Ve1 (=1.50 V) and the terminal voltage Ve4 (=1.20 V) is stored as a third voltage difference Vdef3 (=0.3 V).

Subsequently, each of the first, second and third voltage differences Vdef1, Vdef2 and Vdef3 is compared with a reference value Vdef' which is a reference value to determine which combination of cells is most appropriate to be used for charging the electric double layer capacitor 20, and any cell which makes the voltage difference Vdef (Vdef1, Vdef2 or Vdef3) greater than the reference value Vdef' is removed from possible combinations of cells (step S133). If the reference value Vdef' is set at 0.2 V in the aforementioned example, the fourth cell E4 is removed from the possible combinations of cells since the third voltage difference Vdef3 (=0.3 V) exceeds the reference value Vdef' though each of the first and second voltage differences Vdef2 and Vdef3 is smaller than the reference value Vdef'.

Subsequently, the withstand voltage Vmax is read out from the peripheral memory 53 (step S135), and a data table providing a listing of possible cells and possible combinations of cells which are within a range from the terminal voltage Vc as a lower limit to the withstand voltage Vmax as an upper limit is created (step S137). Table 1 below shows such a data table created in the aforementioned example. It is herein assumed in this example that the withstand voltage Vmax is 5.0 V and that the terminal voltage Vc of the electric double layer capacitor 20 detected at step S111 is 1.2 V.

TABLE 1

|        |                  |       |
|--------|------------------|-------|
|        |                  | >Vc   |
| No. 1: | only E1          |       |
| No. 2: | E1 and E2        |       |
| No. 3: | E1 and E3        |       |
| No. 4: | E1 and E2 and E3 |       |
|        |                  | ≦Vmax |

A selection process ("SELECTION PROCESS" shown in FIG. 7) is performed in which a combination of two or more cells which can supply the charge voltage V-charge which becomes maximum without exceeding the withstand voltage Vmax of the electric double layer capacitor 20 is selected (step S139). Subsequently, the charge voltage V-charge is set to the voltage (total voltage) of the cells included in a selection V-select (one of the four selections in the above data table) selected via the selection process (step S141), and the step-up transformer 57 is driven (step S143). The step-up transformer 57 is driven at this time in order to step up the voltage (total voltage) input to the first load 61, which decreases due to the charging operation of the electric double layer capacitor 20, to make the first load 61 operate with stability.

Subsequently, the ON/OFF state of the first group of switches 11 (the switches SW10 through SW19) is changed so that the cells included in the selection V-select selected via the selection process are connected to one another in series (step S145). Subsequently, the ON/OFF state of the third group of switches 15 (the switches SW51 through SW54) is changed so that the selected cells connected in series at step S145 are connected in parallel to the electric double layer capacitor 20, while the ON/OFF state of the second group of switches 13 (the switches SW31 through SW34) is changed so that the selected cell is connected in series to thereby start charging the electric double layer capacitor 20 (step S147).

Subsequently, the electric double layer capacitor 20 continues to be charged while the terminal voltage Vc across the electric double layer capacitor 20 is monitored via the first voltage detector 41 until the terminal voltage Vc becomes nearly equal to the charge voltage V-charge (step S149 and if "NO" at step S151). Subsequently, if it is determined at step S151 that the terminal voltage Vc becomes nearly equal to the charge voltage V-charge, the state of connection of the four cells E1 through E4 is changed back to the steady state (i.e., the state of connection of the four cells E1 through E4 when the electric double layer capacitor 20 is not charged)

(step S153). Namely, the switches SW10 through SW13 of the first group of switches 11 are turned ON so that all the four cells E1 through E4 are connected in series, while the switch 31 of the second group of switches 13 is turned ON to connect the serially-connected four cells E1 through E4 to the first load 61. Subsequently, it is determined whether the set-up flag is one (step S155). If the set-up flag is one (if "YES" at step S155), control returns to step S111 while continuing to drive the step-up transformer 57 since the step-up transformer 57 needs to be driven even in the steady state (i.e., in a state where the electric double layer capacitor 20 is not charged) because the remaining quantity of power of the battery is low. If the set-up flag is zero (if "NO" at step S155), the step-up transformer 57 is stopped (step S157), and control returns to step S111 since the first load 61 can be driven stably without driving the step-up transformer 57.

The selection process performed at step S139 will be hereinafter discussed in detail with reference to FIG. 7.

In the selection process, one of the six selections (i.e., Nos. 1 through 3) in which a combination of cells can supply the charge voltage V-charge which becomes maximum without exceeding the withstand voltage Vmax of the electric double layer capacitor 20 is selected from the above data table on condition that the number of cells included in the combination is minimal and that the cells included in the combination are selected in decreasing order of terminal voltage. However, in the case where three of the four cells are dead, only one cell can be selected from the above data table rather than a combination of cells.

In the selection process, firstly the number of the selections in the data table is stored as a variable m in the RAM 30c (step S201). In the particular case shown in Table 1, there are four selections in total, so that the variable m is set at six. Subsequently, as initial data of the selection V-select, a selection No.m in the data table created at step S137, the identification number or numbers of the cell or cells included in selection No.m, and the voltage (total voltage) of the cell or cells included in selection No.m are stored in the RAM 30c (step S203). Subsequently, the variable m is decreased by one (step S205), and it is determined whether the variable m is zero (step S207). If the variable m is not zero (if "NO" at step S207), the operations from step S209 to step S219 through which the selection V-select is compared with the selection No.m are performed, and thereafter control returns to step S205.

At step S209 it is determined whether the voltage of the cell or cells of the selection No.m is equal to or greater than the voltage of the selection V-select. If the voltage of the cell or cells of the selection No.m is smaller than the voltage of the selection V-select (if "NO" at step S209), control returns to step S205. If the voltage of the cell or cells of the selection No.m is equal to or greater than the voltage of the selection V-select (if "YES" at step S209), it is determined at step S211 whether the voltage of the cell or cells of the selection No.m is greater than the voltage of the selection V-select to select another selection whose battery voltage is closer to the withstand voltage Vmax. If the voltage of the cell or cells of the selection No.m is greater than the voltage of the selection V-select (if "YES" at step S211), the currently-set data of the selection V-select are replaced by the data of the selection m, the identification number or numbers of the cells included in the selection No.m and the voltage (total voltage) of the cell or cells included the selection No.m are stored as new data of the selection V-select (step S219), and control returns to step S205.

If the voltage of the cell or cells of the selection No.m is equal to or greater than the voltage of the selection V-select (if "YES" at step S209), and further, if the voltage of the cell or cells of the selection No.m is not greater than the voltage of the selection V-select (if "NO" at step S211); namely, if the voltage of the cell or cells of the selection No.m is equal to the voltage of the selection V-select, it is determined whether the number of cells included in the selection No.m is equal to that included in the selection V-select in order to select a selection including the smaller number of cells (step S213).

If the number of cells included in the selection No.m is not equal to that included in the selection V-select (if "NO" at step S213), it is determined whether the number of cells included in the selection No.m is smaller than that included in the selection V-select (step S215). If the number of cells included in the selection No.m is smaller that included in the selection V-select (if "YES" at step S215), the currently-set data of the selection V-select are replaced by the data of the selection m, the identification number or numbers of the cells included in the selection No.m and the voltage (total voltage) of the cell or cells included in the selection No.m are stored as new data of the selection V-select (step S219), and control returns to step S205.

If the number of cells included in the selection No.m is equal to that included in the selection V-select (if "YES" at step S213), it is determined whether the selection No.m includes any cell which has a higher terminal voltage than of the cell or cells included in the selection V-select, in order to select a selection including a cell which has a higher terminal voltage (step S217). If the selection No.m includes a cell which has a higher terminal voltage than the cell(s) included in the selection V-select, i.e. if "YES" at step S217, the currently-set data of the selection V-select are replaced by the data of the selection m, the identification number or numbers of the cell or cells included in the selection No.m and the voltage (total voltage) of the cell or cells included in the selection No.m are stored as new data of the selection V-select (step S219), and control returns to step S205. If the selection No.m does not include a cell which has a higher terminal voltage than the cell(s) included in the selection V-select, i.e. if "NO" at step S217, control simply returns to step S205.

When the variable m becomes zero as a result of repeating the operations from step S205 to step S219 (if "YES" at step S207), the selection V-select has been compared with all the selections (the four selections in the above particular example), so that control returns to step S205. At this time, the data of a combination of cells which can supply the charge voltage V-charge which becomes maximum without exceeding the withstand voltage Vmax of the electric double layer capacitor 20 is stored in the data of the selection V-select, wherein the number of cells included in the combination is minimal while the terminal voltage across the cells included in the combination is maximum.

As can be understood from the above descriptions, in the power-supply unit 200 of the second embodiment, since the electric double layer capacitor 20 is charged with the charge voltage V-charge which becomes maximum with one cell which has the highest terminal voltage among all the cells E1, E2, E3 or E4 and another one or more of the remaining three cells being connected in series, namely, since the electric double layer capacitor 20 is charged with the charge voltage V-charge close to the withstand voltage Vmax, a plurality of electric double layer capacitors do not have to be used and connected in series even if the sum of the terminal voltages across the cells used in combination with the electric double layer capacitor 20 is greater than the withstand voltage Vmax. Furthermore, the electric double layer capacitor 20 can be charged without the use of a voltage converter or the like.

In the power-supply unit 200 of the second embodiment, since the electric double layer capacitor 20 is charged by combining a cell which has the highest terminal voltage and another cell or cells so that these cells are selected in decreasing order of terminal voltage, cell-to-cell variation in the remaining quantity of power can be reduced while the efficiency of consumption of all the cells can be increased. Consequently, even if new and used cells are mixed, the cell which has a low terminal voltage is not used and removed from possible combinations of cells in the operation at step S133. Furthermore, if the terminal voltage across the cell becomes close to the final voltage level (safety assurance level) thereof, it is determined that the remaining quantity of power of the cell is zero, so that the cell which has a terminal voltage nearly equal to, equal to, or less than the final voltage level can be prevented from being used. This makes it possible to prevent various problems such as leakage of liquid of battery, a malfunction of an electronic device or a breakdown of an electronic device from occurring.

In the case where the cells used include a cell which has a lower terminal voltage than a predetermined level, the cell which has a terminal voltage nearly equal to or lower than the final voltage level can be prevented from being used if a combination of new and used cells are used, wherein signals are sent to the indicator 59 to display an indication to warn the user that the old cell needs to be renewed.

In the second embodiment of the power-supply unit 200, since the step-up transformer 57 is driven when the electric double layer capacitor 20 is charged or when the remaining quantity of power of the battery is low, the voltage input to the first load 61 can be prevented from varying to make the first load 61 operate with stability. Furthermore, in the second embodiment of the power-supply unit 200, even if none of the cells E1 through E4 are connected to the power-supply unit 200, the second load 63 can be driven, similar to the power-supply unit 100 of the first embodiment.

In the second embodiment of the power-supply unit 200, although the power-supply unit 200 is provided with the battery chamber 10 which can accommodate a plurality of cells, the battery chamber 10 can be modified so that it can accommodate a removable battery pack.

In each of the first and second embodiments, although the number of cells used for the power-supply unit 100 and 200 is four, the number of cells is not limited solely to four, while the cells used for the power-supply unit can be either the primary battery or the secondary battery.

It is possible to use a stacked type of electric double layer capacitor instead of the electric double layer capacitor 20. In this case, use of such a stacked type capacitor is practical since a load the power consumption of which is greater than that of the second load 63 can be driven.

As can be understood from the foregoing, according to a power-supply unit which incorporates an electric double layer capacitor to which the present invention is applied, since the selected combination of cells can supply a maximum voltage for charging said capacitor without exceeding a withstand voltage of said capacitor, and the electric double layer capacitor is charged with the selected combination of cells, even if the sum of the terminal voltages across the cells used in combination with the electric double layer capacitor is greater than the withstand voltage thereof, a plurality of electric double layer capacitors do not have to be used and connected in series even when the electric double layer capacitor is used in connection with the battery the terminal voltage across which is higher than the withstand voltage of the electric double layer capacitor. Furthermore, the electric double layer capacitor can be charged without the use of a voltage converter and the like.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A power-supply unit comprising:
   a plurality of cells for supplying power to a load;
   a capacitor connected in parallel to said plurality of cells;
   at least one voltage detector which detects a terminal voltage across each of said plurality of cells;
   a selecting device for selecting a first combination from predetermined combinations of at least one of said plurality of cells in accordance with said terminal voltage, wherein said selected first combination of cells can supply a maximum voltage for charging said capacitor without exceeding a withstand voltage of said capacitor; and
   a controller for charging said electric double layer capacitor with said selected first combination of cells.

2. The power-supply unit according to claim 1, wherein said capacitor is comprised of an electric double layer capacitor.

3. The power-supply unit according to claim 2, wherein said selecting device selects said first combination from said predetermined combinations of at least one of said plurality of cells which are connected in series in order with respect to ground, so that a total voltage across said first combination of cells connected in series becomes maximum without exceeding said withstand voltage.

4. The power-supply unit according to claim 2, wherein said plurality of cells are connected in series,
   wherein said power-supply unit further comprises a switch system for connecting each cell included in said first combination of cells to said electric double layer capacitor in parallel, and
   wherein said controller controls said switch system so that each cell included in said first combination of cells is connected in parallel to said electric double layer capacitor.

5. The power-supply unit according to claim 2, wherein said selecting device determines a cell from said plurality of cells which has the highest terminal voltage among said plurality of cells, and selects a second combination from one of said cell which has the highest terminal voltage among said plurality of cells and predetermined combinations of said cell which has the highest terminal voltage among said plurality of cells and at least one of the remaining cells of said plurality of cells; wherein the total voltage across said second combination of cells connected in series becomes maximum without exceeding a withstand voltage of said electric double layer capacitor.

6. The power-supply unit according to claim 5, wherein said selecting device selects said second combination from said predetermined combinations, wherein said total voltage across said second combination of cells connected in series becomes maximum without exceeding said withstand voltage of said electric double layer capacitor.

7. The power-supply unit according to claim 6, wherein the number of cells included in said second combination of cells is minimal, and the cells included in said second combination are selected in decreasing order of terminal voltage.

8. The power-supply unit according to claim 6, wherein the priority of selection of said second combination is firstly the closest combination to the withstand voltage, and secondly, the minimal number of cells.

9. The power-supply unit according to claim 5, wherein a second cell among said plurality of cells is removed from said predetermined combinations of cells if a voltage difference between said cell which has the highest terminal voltage among said plurality of cells and said second cell is greater than a reference value.

10. The power-supply unit according to claim 5, further comprising a first switch system for connecting said plurality of cells in series in predetermined combinations, and a second switch system for connecting each of said predetermined combinations of cells to said electric double layer capacitor in parallel, wherein said controller controls said first switch system so that cells included in said second combination are connected in series, and controls said second switch system so that said cells included in said second combination which are connected in series are connected in parallel with respect to said electric double layer capacitor.

11. The power-supply unit according to claim 5, further comprising a step-up transformer which steps up a voltage output from said selected first combination of cells connected in series to a predetermined voltage level, wherein said controller drives said step-up transformer to step up said voltage output from said selected combination of cells connected in series to supply said stepped up voltage to said load when said electric double layer capacitor is charged.

12. The power-supply unit according to claim 11, wherein said controller drives said step-up transformer to step up said voltage output from said selected first combination of cells connected in series to supply said stepped up voltage to said load when a total voltage of said plurality of cells is lower than a predetermined threshold value.

13. The power-supply unit according to claim 2, further comprising an indicator for indicating various pieces of information;

wherein, if a total voltage of said plurality of cells is lower than a predetermined threshold value, said controller sends signals to said indicator to display an indication for informing a user that there is not sufficient battery power to charge said electric double layer capacitor, and prohibits said electric double layer capacitor from being charged.

14. The power-supply unit according to claim 13, wherein said controller sends signals to said indicator to display an indication for warning a user that a particular cell included in said plurality of cells needs to be renewed, in the case where the terminal voltage across said particular cell which is detected via said at least one voltage detector is lower than a predetermined threshold value.

15. A power-supply unit comprising:

a battery chamber which accommodates a plurality of cells and comprises a plurality of pairs of contact terminals, wherein each pair of contact terminals of said plurality of pairs of contact terminals respectively contact positive and negative electrodes of a corresponding one of said plurality of cells;

an electric double layer capacitor which can be connected in parallel to said plurality of cells via said plurality of pairs of contact terminals;

at least one voltage detector which detects a terminal voltage across each of said plurality of cells via said plurality of pairs of contact terminals;

a selecting device for selecting a combination from predetermined possible combinations of serially-connected contact terminals included in said plurality of pairs of contact terminals in accordance with said terminal voltage, wherein a combination of cells of said plurality of cells which is determined by said selected possible combination of serially-connected contact terminals can supply a maximum voltage for charging said electric double layer capacitor without exceeding a withstand voltage of said electric double layer capacitor; and a controller which connects one and another terminals of said selected combination of serially-connected contact terminals to one and another terminals of said electric double layer capacitor.

16. A method of charging an electric double layer capacitor provided in a power-supply unit in which at least two of a plurality of cells are connected in series to be connected in parallel to said electric double layer capacitor to supply power from said serially-connected at least two cells to a load, said charging method comprising:

detecting a terminal voltage across each of said plurality of cells;

selecting a combination from predetermined combinations of at least one of said plurality of cells in accordance with said terminal voltage, wherein said selected combination of cells can supply a maximum voltage for charging said electric double layer capacitor without exceeding a withstand voltage of said electric double layer capacitor; and connecting said selected combination of cells to said electric double layer capacitor in parallel to charge said electric double layer capacitor with said selected combination of cells.

17. The method of charging an electric double layer capacitor according to claim 16, wherein said at least one of said plurality of cells are connected in series in order with respect to ground, so that a total voltage across said combination of cells connected in series becomes maximum without exceeding said withstand voltage.

18. The charging method according to claim 16, further comprising:

determining a cell from said plurality of cells which has the highest terminal voltage among said plurality of cells, and selecting a second combination from predetermined combinations of said determined cell and at least one of the remaining cells of said plurality of cells, wherein the total voltage across said second combination of cells connected in series becomes maximum without exceeding a withstand voltage of said electric double layer capacitor.

* * * * *